United States Patent
Tutton et al.

(10) Patent No.: US 10,823,120 B2
(45) Date of Patent: Nov. 3, 2020

(54) SPARK IGNITED ENGINE LOAD EXTENSION WITH LOW PRESSURE EXHAUST GAS RECIRCULATION AND DELTA PRESSURE VALVE

(71) Applicants: Tyler Tutton, Royal Oak, MI (US); William P Attard, Brighton, MI (US); Michael Barkey, Maidstone (CA)

(72) Inventors: Tyler Tutton, Royal Oak, MI (US); William P Attard, Brighton, MI (US); Michael Barkey, Maidstone (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/676,609

(22) Filed: Nov. 7, 2019

(65) Prior Publication Data
US 2020/0158051 A1 May 21, 2020

Related U.S. Application Data

(60) Provisional application No. 62/768,263, filed on Nov. 16, 2018.

(51) Int. Cl.
*F02M 26/06* (2016.01)
*F02M 26/08* (2016.01)
(Continued)

(52) U.S. Cl.
CPC .......... *F02M 26/06* (2016.02); *F02B 37/001* (2013.01); *F02B 37/18* (2013.01); *F02B 75/18* (2013.01);
(Continued)

(58) Field of Classification Search
CPC .................. F02D 2009/0272; F02M 26/06
See application file for complete search history.

(56) References Cited

U.S. PATENT DOCUMENTS 7,895,838 B2 * 3/2011 Ono ................. F01N 3/035
123/568.11
8,601,813 B2 * 12/2013 Shutty ............. F02D 41/0072
60/605.2
(Continued)

FOREIGN PATENT DOCUMENTS

DE 102013000040 A1 7/2014
EP 2397677 A1 * 12/2011 ............ F02M 26/38
(Continued)

*Primary Examiner* — Kevin R Steckbauer
(74) *Attorney, Agent, or Firm* — Ralph E. Smith

(57) ABSTRACT

Techniques for controlling a forced-induction engine having a low pressure exhaust gas recirculation (LPEGR) system comprise determining a desired differential pressure (dP) at an inlet of a boost device based on an engine mass air flow (MAF) and a speed of the engine, wherein the engine further comprises a dP valve disposed upstream from an EGR port and a throttle valve disposed downstream from the boost device, determining a desired EGR mass fraction based on at least the engine MAF and the engine speed, determining a maximum throttle inlet pressure (TIP) based on the engine speed, the desired EGR mass fraction, and a barometric pressure, and performing coordinated control of the dP valve and the throttle valve based on the desired dP and the maximum TIP, respectively, thereby extending EGR operability to additional engine speed/load regions and increasing engine efficiency.

18 Claims, 3 Drawing Sheets

(51) Int. Cl.
*F02D 9/08* (2006.01)
*F02M 26/48* (2016.01)
*F02M 35/10* (2006.01)
*F02B 37/00* (2006.01)
*F02B 75/18* (2006.01)
*F02B 37/18* (2006.01)
*F02M 26/43* (2016.01)
*F02M 26/23* (2016.01)
*F02D 41/00* (2006.01)
*F02D 9/02* (2006.01)

(52) U.S. Cl.
CPC ........... *F02D 9/08* (2013.01); *F02D 41/0052* (2013.01); *F02M 26/08* (2016.02); *F02M 26/23* (2016.02); *F02M 26/43* (2016.02); *F02M 26/48* (2016.02); *F02M 35/1038* (2013.01); *F02M 35/10222* (2013.01); *F02M 35/10236* (2013.01); *F02M 35/10255* (2013.01); *F02B 2075/1824* (2013.01); *F02D 2009/0272* (2013.01); *F02D 2200/0404* (2013.01); *F02D 2200/0406* (2013.01); *F02D 2200/101* (2013.01); *F02D 2200/703* (2013.01); *F02D 2250/26* (2013.01)

(56) References Cited

U.S. PATENT DOCUMENTS

| | | | | |
|---|---|---|---|---|
| 8,646,271 B2 * | 2/2014 | Yasui | .................. | F02D 41/0047 60/605.2 |
| 9,181,904 B2 * | 11/2015 | Jankovic | .............. | F02D 41/0002 |
| 9,228,548 B2 * | 1/2016 | Takaki | .................... | F02B 37/00 |
| 9,341,127 B2 * | 5/2016 | Brewbaker | ......... | F02D 41/0072 |
| 9,528,476 B2 * | 12/2016 | Surnilla | ................. | F02M 26/52 |
| 9,587,596 B2 * | 3/2017 | Styles | .................... | F02M 26/28 |
| 9,664,129 B2 * | 5/2017 | Surnilla | .............. | F02D 41/0072 |
| 9,790,877 B2 * | 10/2017 | Shim | .................... | F02D 41/0072 |
| 9,932,938 B2 * | 4/2018 | Surnilla | .................. | F02M 26/52 |
| 10,247,142 B1 * | 4/2019 | Wang | .................... | F02M 26/06 |
| 10,344,691 B2 * | 7/2019 | Wang | .................. | F02D 41/0077 |
| 10,364,764 B2 * | 7/2019 | Wang | .................. | F02D 41/2451 |
| 2008/0295514 A1 * | 12/2008 | Ono | ........................ | F01N 9/002 60/602 |
| 2010/0101226 A1 * | 4/2010 | Shutty | .................... | F02M 26/05 60/602 |
| 2011/0313634 A1 * | 12/2011 | Yasui | .................. | F02D 41/0072 701/102 |
| 2012/0037134 A1 * | 2/2012 | Jankovic | ............... | F02M 26/47 123/568.21 |
| 2013/0205774 A1 * | 8/2013 | Styles | .................... | F02M 26/43 60/605.2 |
| 2014/0130783 A1 * | 5/2014 | Takaki | ................ | F02D 41/1446 123/568.11 |
| 2015/0345415 A1 * | 12/2015 | Shim | .................. | F02D 41/0072 123/568.21 |
| 2015/0354483 A1 * | 12/2015 | Brewbaker | ......... | F02D 41/1401 60/605.2 |
| 2016/0177847 A1 * | 6/2016 | Surnilla | ................. | F02M 26/16 701/108 |
| 2016/0230684 A1 * | 8/2016 | Surnilla | .............. | F02D 41/0077 |
| 2017/0074215 A1 * | 3/2017 | Surnilla | .............. | F02D 41/1495 |
| 2019/0128196 A1 * | 5/2019 | Wang | .................... | F02M 26/06 |
| 2019/0128197 A1 * | 5/2019 | Wang | .................. | F02D 41/0072 |
| 2019/0176810 A1 | 6/2019 | Dudar | | |
| 2019/0353109 A1 * | 11/2019 | Hamamoto | ......... | F02D 41/0007 |
| 2020/0158032 A1 * | 5/2020 | Lawrence | ............. | F02M 26/08 |
| 2020/0158038 A1 * | 5/2020 | Wang | .................. | F02D 41/0077 |
| 2020/0158042 A1 * | 5/2020 | Tutton | ............... | F02D 41/2432 |

FOREIGN PATENT DOCUMENTS

WO   WO-2007085944 A1 *   8/2007   ......... F02D 41/0055
WO        2010092245 A1      8/2010

* cited by examiner

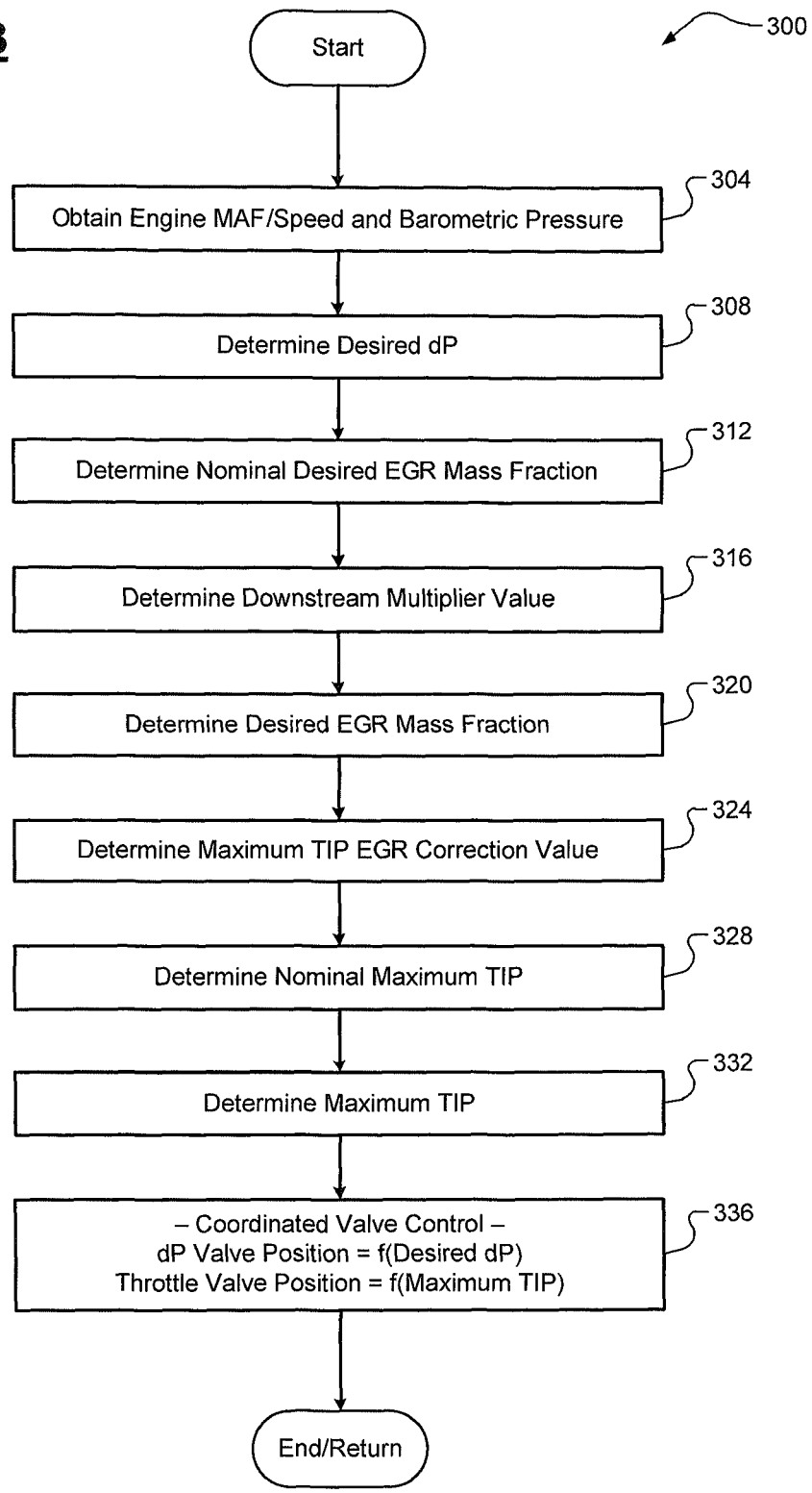

SPARK IGNITED ENGINE LOAD EXTENSION WITH LOW PRESSURE EXHAUST GAS RECIRCULATION AND DELTA PRESSURE VALVE

CROSS-REFERENCE TO RELATED APPLICATION(S)

The present application claims the benefit of U.S. Provisional Application No. 62/768,263, filed on Nov. 16, 2018. The disclosure of the above-identified application is incorporated herein by reference in its entirety.

FIELD

The present application generally relates to exhaust gas recirculation (EGR) and, more particularly, to techniques for extended load operation in a spark-ignition (SI) engine by utilizing a low pressure, cooled EGR (LPCEGR) system and a delta pressure (dP) valve.

BACKGROUND

A spark-ignition (SI) engine combusts a mixture of air and fuel (e.g., gasoline) within cylinders using spark provided by spark plugs. In low speed, high load operating regions, SI engines are highly susceptible to low-speed pre-ignition (LSPI) and engine knock. Exhaust gas recirculation (EGR) is often utilized to decrease engine auto-ignition/knock. EGR, however, may be unavailable at some operating conditions, such as the low speed, high load regions described above. This is because the EGR system may be unable to provide the requisite high EGR flow rate for such low engine speed, high load regions. This scenario could be particularly true for a turbocharged SI engine having a low pressure EGR (LPEGR) system that lacks the high pressures to provide a high EGR flow at low engine speed, high load regions (e.g., the EGR takeoff being placed in a low pressure environment, such as downstream of a three-way catalytic converter (TWC) catalyst). Accordingly, while conventional SI engine systems do work well for their intended purpose, there remains a need for improvement in the relevant art.

SUMMARY

According to one example aspect of the invention, a control system for a forced-induction engine having a low pressure exhaust gas recirculation (LPEGR) system configured to recirculate exhaust gas produced by the engine to an induction system of the engine via an EGR port is presented. In one exemplary implementation, the control system comprises: a differential pressure (dP) valve disposed upstream from the EGR port, wherein the EGR port is disposed upstream from an inlet of a boost device of the engine, a throttle valve disposed downstream from the boost device, and a controller configured to: determine a desired dP based on an engine mass air flow (MAF) and a speed of the engine, determine a desired EGR mass fraction based on at least the engine MAF and the engine speed, determine a maximum throttle inlet pressure (TIP) based on the engine speed, the desired EGR mass fraction, and a barometric pressure, and perform coordinated control of the dP valve and the throttle valve based on the desired dP and the maximum TIP, respectively, thereby extending EGR operability to additional engine speed/load regions and increasing engine efficiency.

In some implementations, the controller is configured to determine the desired EGR mass fraction by: determining a nominal desired EGR mass fraction using a two-dimensional calibrated surface based on the engine MAF and the engine speed, and multiplying the nominal desired EGR mass fraction by a downstream modifier value indicative of at least one of induction system pressures, temperatures, and valve positions. In some implementations, the valve positions include at least one of the dP valve's position, a surge or bypass valve's position, the throttle valve's position, intake/exhaust valve positions, a wastegate or blow-off valve's position, and an EGR valve's position.

In some implementations, the controller is configured to determine the maximum TIP by: determining a nominal maximum TIP using a two-dimensional calibrated surface based on the engine speed and the barometric pressure, and multiplying the nominal maximum TIP by a maximum TIP EGR correction value. In some implementations, the controller is configured to determine the maximum TIP EGR correction value using a two-dimensional calibrated surface based on the engine speed and a ratio of the desired EGR mass fraction to the nominal desired EGR mass fraction.

In some implementations, the coordinated dP and throttle valve control extends EGR operability to additional engine speed/load regions by mitigating or eliminating low-speed pre-ignition (LSPI) and knock. In some implementations, the controller is further configured to decrease or limit a maximum achievable engine torque when EGR flow cannot be delivered. In some implementations, the coordinated dP and throttle valve control extends EGR operability to additional engine speed/load regions without using blow-through scavenging, in-cylinder fuel enrichment, combustion chamber design changes, or fuel/oil quality changes. In some implementations, the engine is a twin-turbocharged, six cylinder engine and the LPEGR system is a low pressure cooled EGR (LPCEGR) system that is associated with one turbocharger loop of the engine.

According to another example aspect of the invention, a method of controlling a forced-induction engine having an LPEGR system configured to recirculate exhaust gas produced by the engine to an induction system of the engine via an EGR port upstream from a boost device of the engine is presented. In one exemplary implementation, the method comprises: determining, by a controller of the engine, a desired dP at an inlet of the boost device based on an engine MAF and a speed of the engine, wherein the engine further comprises a dP valve disposed upstream from the EGR port and a throttle valve disposed downstream from the boost device, determining, by the controller, a desired EGR mass fraction based on at least the engine MAF and the engine speed, determining, by the controller, a maximum TIP based on the engine speed, the desired EGR mass fraction, and a barometric pressure, and performing, by the controller, coordinated control of the dP valve and the throttle valve based on the desired dP and the maximum TIP, respectively, thereby extending EGR operability to additional engine speed/load regions and increasing engine efficiency.

In some implementations, the determining the desired EGR mass fraction comprises: determining a nominal desired EGR mass fraction using a two-dimensional calibrated surface based on the engine MAF and the engine speed, and multiplying the nominal desired EGR mass fraction by a downstream modifier value indicative of at least one of induction system pressures, temperatures, and valve positions. In some implementations, the valve positions include at least one of the dP valve's position, a surge or bypass valve's position, the throttle valve's position, intake/exhaust valve positions, a wastegate or blow-off valve's position, and an EGR valve's position.

In some implementations, determining the maximum TIP comprises: determining a nominal maximum TIP using a two-dimensional calibrated surface based on the engine speed and the barometric pressure, and multiplying the nominal maximum TIP by a maximum TIP EGR correction value. In some implementations, determining the maximum TIP EGR correction value comprises using a two-dimensional calibrated surface based on the engine speed and a ratio of the desired EGR mass fraction to the nominal desired EGR mass fraction.

In some implementations, the coordinated dP and throttle valve control extends EGR operability to additional engine speed/load regions by mitigating or eliminating LSPI and knock. In some implementations, the method further comprises decreasing or limiting, by the controller, a maximum achievable engine torque when EGR flow cannot be delivered. In some implementations, the coordinated dP and throttle valve control extends EGR operability to additional engine speed/load regions without using blow-through scavenging, in-cylinder fuel enrichment, combustion chamber design changes, or fuel/oil quality changes. In some implementations, the engine is a twin-turbocharged, six cylinder engine and the LPEGR system is a low pressure cooled EGR (LPCEGR) system that is associated with one turbocharger loop of the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a flow diagram of an example method of controlling a forced-induction engine having a LPEGR system and a dP valve to extend EGR operation to additional engine speed/load regions and increase engine efficiency according to the principles of the present disclosure.

DETAILED DESCRIPTION

As previously discussed, spark-ignition (SI) engine systems, particularly turbocharged SI engines having low pressure exhaust gas recirculation (EGR) systems, are often unable to provide the required high level of EGR in low speed, high load operating regions of the engine to prevent low-speed pre-ignition (LSPI) and knock. As a result, engine torque output is often limited at these operating conditions. Conventional solutions to this problem include blow-through scavenging, in-cylinder fuel enrichment, combustion chamber design changes (e.g., redesign), and fuel/oil qualities changes (e.g., requiring a different quality fuel and/or oil). Each of these solutions decreases fuel economy or efficiency or increases costs. Accordingly, techniques are presented for extended EGR operation of a turbocharged SI engine having a low pressure EGR (LPEGR) system (e.g., a low pressure cooled EGR, or LPCEGR system) to additional engine speed/load regions by introducing a delta or differential pressure (dP) valve upstream from an EGR port in an induction system of the engine. These techniques utilize a ratio of nominal desired EGR to current desired EGR to limit a full-load engine torque/speed curve. This results in a maximum throttle inlet pressure (TIP) modifier based on achievable EGR flow when compared to nominal EGR flow. The requested EGR keeps the request stable, reducing boost request oscillation potential. Actual EGR, which is susceptible to oscillations, also protects against instances where actual EGR flow isn't meeting the request prior to on-board diagnostic (OBD) intervention (EGR valve wide open, EGR valve stuck etc.). The throttle and dP valves are then controlled accordingly. Potential benefits of these techniques include improved drivability/performance due to the extended EGR operation at higher torque levels.

Figure 1:
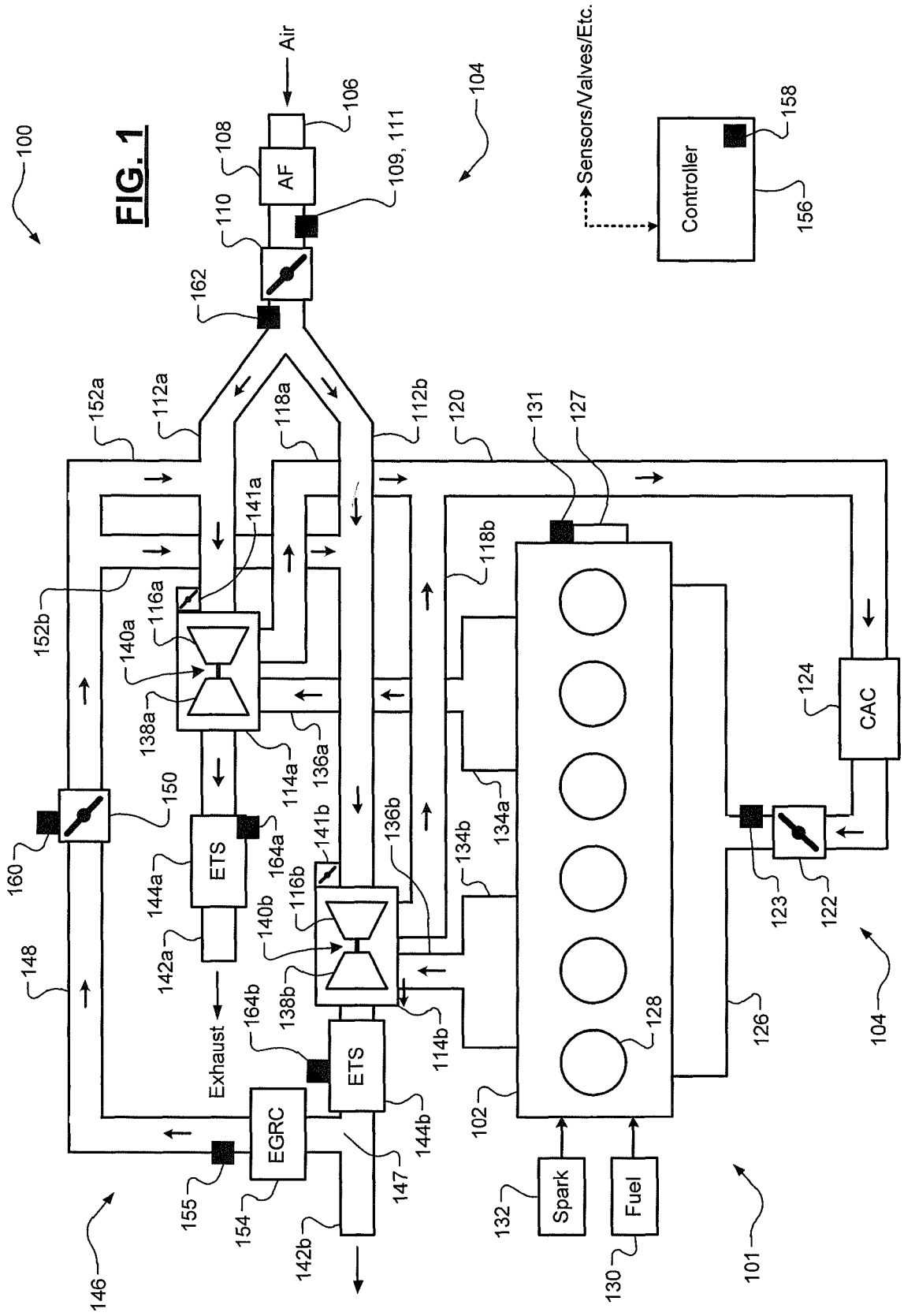
FIG. 1 is a diagram of an example vehicle having a turbocharged engine with a low pressure, cooled exhaust gas recirculation (LPCEGR) system and a delta pressure (dP) valve according to the principles of the present disclosure.

Referring now to FIG. 1, an example engine system 101 for a vehicle or vehicle powertrain 100 is illustrated. The engine system 101 includes a gasoline engine 102 that receives air from an induction system 104. While a gasoline engine is specifically illustrated and discussed herein, it will be appreciated that the techniques of the present disclosure could also be applicable to any suitable internal combustion engines having LPEGR systems and a dP valve. An induction path 106 receives fresh air that is filtered by an air filter (AF) 108. A dP valve 110 regulates the flow of air through the induction path 106 and a pressure in induction paths 112a, 112b. Turbochargers 114a, 114b comprise compressors 116a, 116b ("compressors 116") that force air/exhaust gas from the induction paths 112a, 112b through induction paths 118a, 118b that converge into a single induction path 120. While two turbochargers 114a and 114b are shown, it will be appreciated that the engine system 101 could have only one turbocharger and associated piping. It will also be appreciated that one or both turbochargers 114a, 114b could include surge or bypass valve systems (not shown) that selectively bypass the respective compressors 116a, 166b to avoid compressor surge. It will also be appreciated that the engine 102 could have any suitable forced-induction system or boost device, such as a supercharger instead of turbocharger(s). A throttle valve 122 regulates the flow of air/exhaust gas through a CAC 124 and into an intake manifold 126. It will be appreciated that the throttle 122 could be implemented upstream from the CAC 124. The air/exhaust gas in the intake manifold 126 is provided to a plurality of cylinders 128 via respective intake valves (not shown), combined with gasoline from a fuel system 130 and combusted by spark from spark plugs 132 to drive pistons (not shown) that generate drive torque at a crankshaft 127.

While six cylinders are shown, it will be appreciated that the engine 102 could include any suitable number of cylinders (4, 8, etc.). An engine speed sensor 131 measures a rotational speed of the crankshaft 127, also known as a speed of the engine 102. In one exemplary implementation, the fuel system 130 comprises a fuel tank that houses fuel (e.g., gasoline), a fuel rail that houses pressurized fuel, fuel injectors that open/close to inject the pressurized fuel into the engine 102, and a fuel pump that pumps the fuel from the fuel tank to the fuel rail to generate the pressurized fuel. The fuel system 130 could also optionally include an evaporative emissions (EVAP) system that captures fuel or "purge" vapor that evaporates from the fuel in the fuel tank and stores it in a vapor canister and provides the fuel vapor to any suitable point in the induction system 104 (e.g., after the dP valve 110) via an EVAP line and a purge valve. Fuel vapor is highly combustible and therefore is able to increase engine power and/or efficiency. Exhaust gas resulting from combustion is expelled from the cylinders 128 via respective exhaust valves (not shown) into exhaust manifolds 134*a*, 134*b*. Each exhaust manifold 134*a*, 134*b*, for example, could be associated with three of the six cylinders 128. The exhaust gas in exhaust manifold 134*a* flows through exhaust path 136*a* and its kinetic energy drives a turbine 138*a* of turbocharger 114*a*. The turbine 138*a* drives compressor 116*a* via a shaft 140*a*. Similarly, the exhaust gas in exhaust manifold 134*b* flows through exhaust path 136*b* and its kinetic energy drives a turbine 138*b* of turbocharger 114*b*, which in turn drives compressor 116*b* via a shaft 140*b*. Wastegate valves 141*a*, 141*b* regulate turbocharger speed/boost pressure.

The exhaust gas flows from turbines 138*a*, 138*b* through exhaust paths 142*a*, 142*b* and is treated by exhaust treatment systems (ETS) 144*a*, 144*b* to decrease or eliminate emissions before being released into the atmosphere. Non-limiting example components include gasoline particulate filters (GPFs), three-way catalytic converters (TWCs), and mufflers. It will be appreciated that each ETS 144*a*, 144*b* could include other exhaust treatment components. A low pressure EGR (LPEGR) system 146 recirculates exhaust gas from an EGR pickup point 147 downstream of ETS 144*b* through an EGR path 148 that is regulated by an EGR valve 150. The EGR path 148 splits into separate EGR paths 152*a*, 152*b* which direct the exhaust gas to ports in induction paths 112*a*, 112*b* downstream of the dP valve 110 and upstream of the compressors 116*a*, 116*b*. In one implementation, the LPEGR system 146 is an LPCEGR system that also includes an EGR cooler (EGRC) 154 that cools the exhaust gas. Because turbocharged gasoline engines operate at very high temperatures, cooling of the recirculated exhaust gas could provide for increased performance. A controller 156 controls operation of the engine system 101. It will be appreciated that the term "controller" as used herein refers to any suitable control device or set of multiple control devices that is/are configured to perform at least a portion of the techniques of the present disclosure. Non-limiting examples include an application-specific integrated circuit (ASIC) and one or more processors and a non-transitory memory having instructions stored thereon that, when executed by the one or more processors cause the controller to perform a set of operations. The one or more processors could be a single processor or two or more processors operating in a parallel or distributed architecture.

Optional inlet air temperature and mass air flow (MAF) sensors 109, 111 measure intake air temperature and intake mass air flow. It will be appreciated that these sensors 109, 111 could also be arranged in other suitable positions of the induction system 104. An optional charge air temperature sensor 123 measures ACT at an outlet of the throttle valve 122. An optional EGRC outlet temperature sensor 155 measures a temperature of EGR at an outlet of the EGRC 154. The controller 156 includes a barometric pressure sensor 158 that measures barometric pressure. It will be appreciated that the barometric sensor 158 could be external to the controller 156. An EGR valve delta pressure sensor 160 is disposed proximate to the EGR valve 150 and measures a delta pressure across the EGR valve 150. A dP valve outlet pressure sensor 162 measures a pressure at an outlet of the dP valve 110. As previously mentioned, this dP valve outlet pressure also corresponds to inlet pressures of the compressors 116*a*, 116*b*. Lastly, exhaust gas concentration sensors 164*a*, 164*b* measure exhaust gas concentration. In one exemplary implementation, the exhaust gas concentration sensors 164*a*, 164*b* are WRO2 sensors configured to measure an air/fuel ratio (FA) of the exhaust gas. It will be appreciated that the engine system 101 could include other suitable sensors, such as an exhaust gas or back pressure sensor (not shown). All of these sensors provide their measurements to the controller 156, e.g., via a controller area network (CAN, not shown). The controller 156 is also able to control the various valves and other devices/systems described herein, e.g., via the CAN. The controller 156 is also configured to implement at least a portion of the techniques of the present disclosure, which are now described in greater detail.

Figure 2:
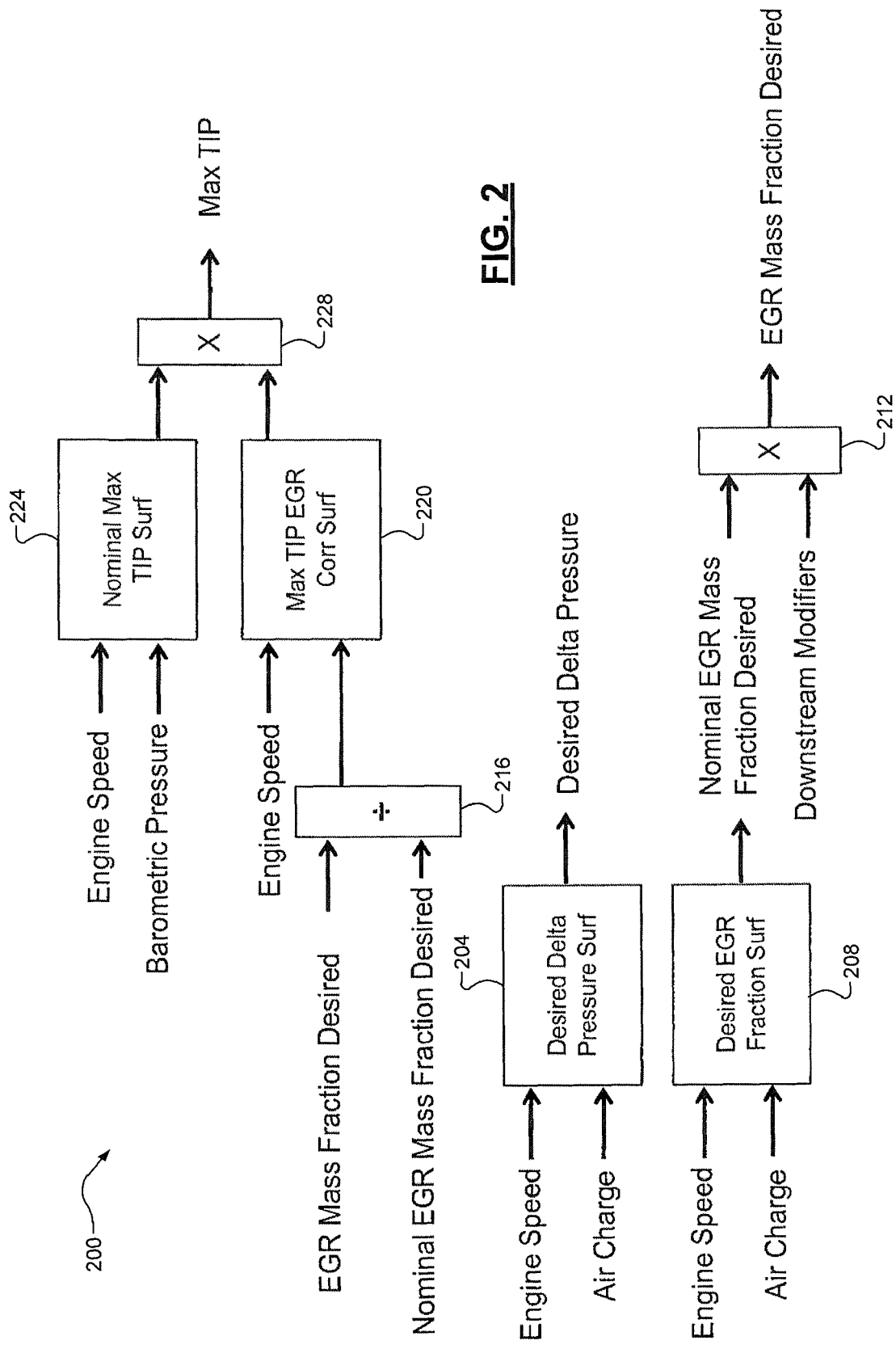
FIG. 2 is a functional block diagram of an example control architecture for extended EGR operation in an engine having an LPCEGR system and dP valve according to the principles of the present disclosure.

Referring now to FIG. 2, a functional block diagram of an example control architecture 200 for extended EGR operation of an SI engine having an LPEGR system and a dP valve (e.g., engine system 101) to additional engine speed/load regions. At 204, a desired dP is determined using a calibrated surface with engine speed and air charge (e.g., from sensors 131 and 111) as inputs. This desired dP is used to control the dP valve 110. At 208, a nominal EGR mass fraction desired is determined using a calibrated surface with engine speed and air charge as inputs. This nominal EGR mass fraction desired is fed into a multiplier block 212 along with other downstream modifiers to obtain an EGR mass fraction desired. These downstream modifiers could include, for example, the dP valve position, induction system temperatures/pressures, and any other suitable parameters such as other valve positions. The nominal EGR mass fraction desired from 208 and the EGR mass fraction desired from 212 are both fed into a division block 216 that calculates a ratio of the two values. This calculated ratio is fed to a maximum TIP EGR correction surface 220 along with the engine speed and a maximum TIP multiplier is output. A nominal maximum TIP surface 224 also outputs a maximum TIP value based on engine speed and barometric pressure (e.g., from sensor 158) as inputs. Both of these values are fed into multiplier block 228, where the maximum TIP multiplier modifies the maximum TIP value to obtain a final maximum TIP value (Max TIP). This final maximum TIP value is then utilized as a target value for controlling the throttle valve 122, whereas the dP valve 110 is controlled with the desired dP as its target value.

Referring now to FIG. 3, a flow diagram of an example method 300 of controlling a forced-induction engine having a LPEGR system and a dP valve to extend EGR operation to additional engine speed/load regions and increase engine efficiency according to the principles of the present disclosure. While the engine system 101 illustrated and specifically discussed herein will be referenced, it will be appreciated that this method 300 could be applicable to any forced-induction gasoline engine having a LPEGR system and a dP valve. At 304, the controller 156 obtains a set of parameters, including engine MAF (i.e., air charge), engine speed, and barometric pressure. It will be appreciated that these parameters could be measured (e.g., by sensors 111, 131, and 158) or modeled based on other parameters. At 308, the controller 156 determines a desired dP (e.g., based on the engine speed and engine MAF using a two-dimensional calibrated surface). At 312, the controller 156 determines a nominal desired EGR mass fraction (e.g., based on engine speed and engine MAF using a two-dimensional calibrated surface). It will be appreciated that steps 308 and 312 could be performed concurrently or sequentially. At 316, the controller 156 determines a downstream modifier value (e.g., based on other engine valves that could affect engine airflow). At 320, the controller 156 determines a desired EGR mass fraction (e.g., based on a product of the nominal desired EGR mass fraction and the downstream modifier value). At 324, the controller 156 determines a maximum TIP EGR correction value (e.g., based on engine speed and a ratio of desired EGR mass fraction to nominal desired EGR mass fraction using a two-dimensional calibrated surface). At 328, the controller 156 determines a nominal maximum TIP (e.g., based on engine speed and barometric pressure using a two-dimensional calibrated surface). It will be appreciated that steps 324 and 328 could be performed concurrently or sequentially. At 332, the controller 156 determines a maximum TIP (e.g., based on a product of the nominal maximum TIP and the maximum TIP EGR correction value). At 336, the controller 156 performed coordinated control of the dP valve 110 and the throttle valve 122 based on the desired dP and the maximum TIP, respectively, thereby extending EGR operation to additional engine speed/load regions and increasing engine efficiency. The method 300 then ends or returns to 304 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a forced-induction engine having a low pressure exhaust gas recirculation (LPEGR) system configured to recirculate exhaust gas produced by the engine to an induction system of the engine via an EGR port, the control system comprising:
   a differential pressure (dP) valve disposed upstream from the EGR port, wherein the EGR port is disposed upstream from an inlet of a boost device of the engine;
   a throttle valve disposed downstream from the boost device; and
   a controller configured to:
      determine a desired dP based on an engine mass air flow (MAF) and a speed of the engine;
      determine a desired EGR mass fraction based on at least the engine MAF and the engine speed;
      determine a maximum throttle inlet pressure (TIP) based on the engine speed, the desired EGR mass fraction, and a barometric pressure; and
      perform coordinated control of the dP valve and the throttle valve based on the desired dP and the maximum TIP, respectively, thereby extending EGR operability to additional engine speed/load regions and increasing engine efficiency.

2. The control system of claim 1, wherein the controller is configured to determine the desired EGR mass fraction by:
   determining a nominal desired EGR mass fraction using a two-dimensional calibrated surface based on the engine MAF and the engine speed; and
   multiplying the nominal desired EGR mass fraction by a downstream modifier value indicative of at least one of induction system pressures, temperatures, and valve positions.

3. The control system of claim 2, wherein the valve positions include at least one of the dP valve's position, a surge or bypass valve's position, the throttle valve's position, intake/exhaust valve positions, a wastegate valve's position, and an EGR valve's position.

4. The control system of claim 2, wherein the controller is configured to determine the maximum TIP by:
   determining a nominal maximum TIP using a two-dimensional calibrated surface based on the engine speed and the barometric pressure; and
   multiplying the nominal maximum TIP by a maximum TIP EGR correction value.

5. The control system of claim 4, wherein the controller is configured to determine the maximum TIP EGR correction value using a two-dimensional calibrated surface based on the engine speed and a ratio of the desired EGR mass fraction to the nominal desired EGR mass fraction.

6. The control system of claim 1, wherein the coordinated dP and throttle valve control extends EGR operability to additional engine speed/load regions by mitigating or eliminating low-speed pre-ignition (LSPI) and knock.

7. The control system of claim 1, wherein the controller is further configured to decrease or limit a maximum achievable engine torque when EGR flow cannot be delivered.

8. The control system of claim 1, wherein the coordinated dP and throttle valve control extends EGR operability to additional engine speed/load regions without using blow-through scavenging or in-cylinder fuel enrichment.

9. The control system of claim 1, wherein the engine is a twin-turbocharged, six cylinder engine and the LPEGR system is a low pressure cooled EGR (LPCEGR) system that is associated with one turbocharger loop of the engine.

10. A method of controlling a forced-induction engine having a low pressure exhaust gas recirculation (LPEGR) system configured to recirculate exhaust gas produced by the engine to an induction system of the engine via an EGR port upstream from a boost device of the engine, the method comprising:
   determining, by a controller of the engine, a desired differential pressure (dP) at an inlet of the boost device based on an engine mass air flow (MAF) and a speed of the engine, wherein the engine further comprises a dP valve disposed upstream from the EGR port and a throttle valve disposed downstream from the boost device;
   determining, by the controller, a desired EGR mass fraction based on at least the engine MAF and the engine speed;
   determining, by the controller, a maximum throttle inlet pressure (TIP) based on the engine speed, the desired EGR mass fraction, and a barometric pressure; and
   performing, by the controller, coordinated control of the dP valve and the throttle valve based on the desired dP and the maximum TIP, respectively, thereby extending EGR operability to additional engine speed/load regions and increasing engine efficiency.

11. The method of claim 10, wherein the determining the desired EGR mass fraction comprises:
   determining a nominal desired EGR mass fraction using a two-dimensional calibrated surface based on the engine MAF and the engine speed; and
   multiplying the nominal desired EGR mass fraction by a downstream modifier value indicative of at least one of induction system pressures, temperatures, and valve positions.

12. The method of claim 11, wherein the valve positions include at least one of the dP valve's position, a surge or bypass valve's position, the throttle valve's position, intake/exhaust valve positions, a wastegate valve's position, and an EGR valve's position.

13. The method of claim 11, wherein determining the maximum TIP comprises:
   determining a nominal maximum TIP using a two-dimensional calibrated surface based on the engine speed and the barometric pressure; and
   multiplying the nominal maximum TIP by a maximum TIP EGR correction value.

14. The method of claim 13, wherein determining the maximum TIP EGR correction value comprises using a two-dimensional calibrated surface based on the engine speed and a ratio of the desired EGR mass fraction to the nominal desired EGR mass fraction.

15. The method of claim 10, wherein the coordinated dP and throttle valve control extends EGR operability to additional engine speed/load regions by mitigating or eliminating low-speed pre-ignition (LSPI) and knock.

16. The method of claim 10, further comprising decreasing or limiting, by the controller, a maximum achievable engine torque when EGR flow cannot be delivered.

17. The method of claim 10, wherein the coordinated dP and throttle valve control extends EGR operability to additional engine speed/load regions without using blow-through scavenging or in-cylinder fuel enrichment.

18. The method of claim 10, wherein the engine is a twin-turbocharged, six cylinder engine and the LPEGR system is a low pressure cooled EGR (LPCEGR) system that is associated with one turbocharger loop of the engine.

* * * * *